Sept. 14, 1948.                F. H. GULLIKSEN                2,449,472
                            POLARIZED REED DEVICE
                         Original Filed Sept. 7, 1939
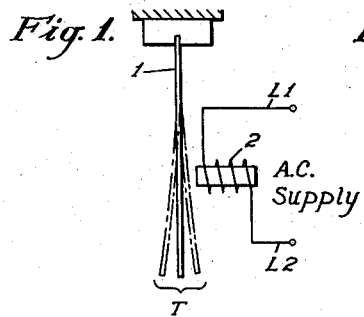
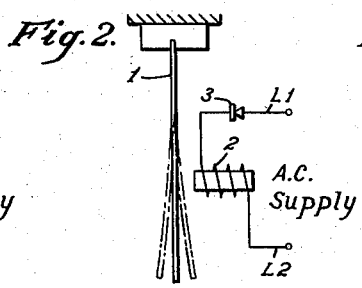
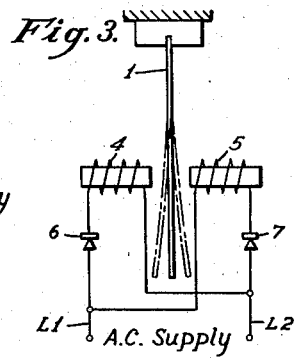
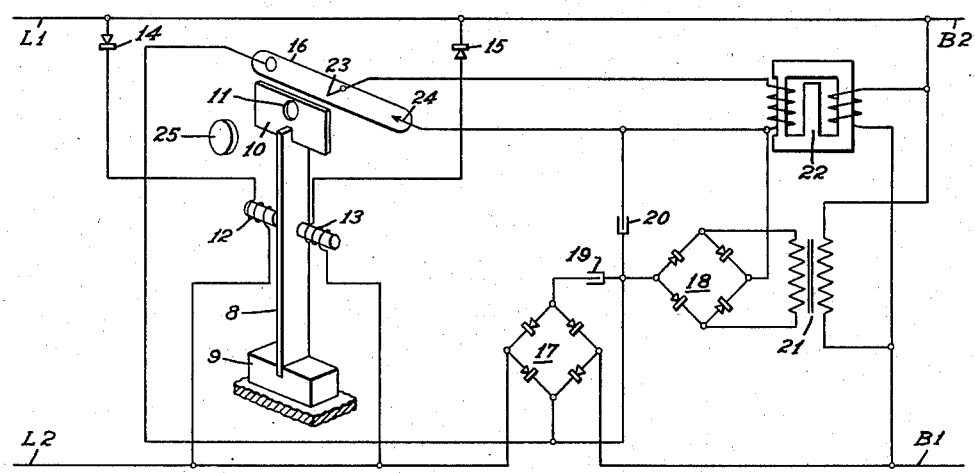
Fig. 4.
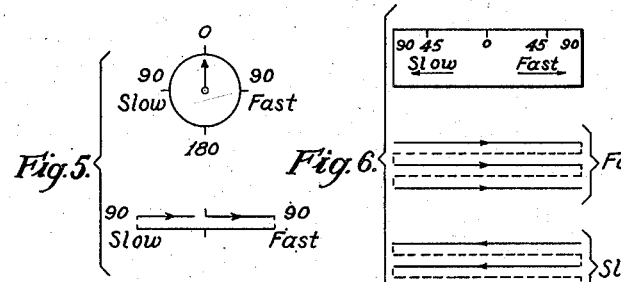
Fig. 5.   Fig. 6.
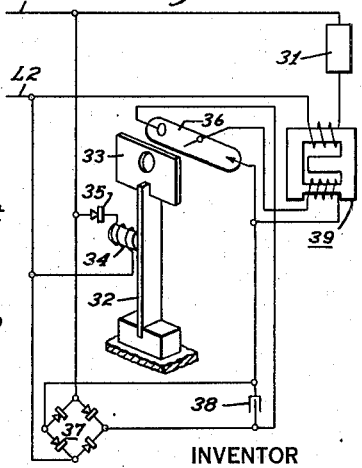
Fig. 7.
WITNESSES:
Edward Michaels
E. F. Oberheim.
INVENTOR
Finn H. Gulliksen.
BY
Paul E. Friedemann
ATTORNEY Patented Sept. 14, 1948

2,449,472

UNITED STATES PATENT OFFICE 2,449,472

POLARIZED REED DEVICE

Finn H. Gulliksen, deceased, late of Oslo, Norway, by Gunvald Gulliksen, administrator, assignor to Westinghouse Electric Corporation, East Pittsburgh, Pa., a corporation of Pennsylvania Original application September 7, 1939, Serial No. 293,724. Divided and this application November 9, 1943, Serial No. 509,642

5 Claims. (Cl. 172—245)

The invention relates broadly to synchronizing apparatus and is a division of copending application Serial No. 293,724, filed September 7, 1939, and entitled Register control system, now U. S. Patent 2,344,656, issued May 23, 1944.

More specifically the invention is directed to a vibrating reed which is not only synchronized but polarized with respect to an alternating current source.

An object of the invention is to provide a substantially inertialess vibrating reed which is polarized with respect to an alternating current source.

Another object of the invention is to provide a vibrating reed which is polarized with respect to an alternating current source, by means of one or more rectifiers and adapting such polarized reed to apparatus wherein a synchronizing feature is necessary such as a synchroscope or a power factor meter.

Other objects and advantages will become more apparent from a study of the following specification when considered in conjunction with the accompanying drawings, in which:

Figure 1 is a schematic showing of a vibrating reed which is not polarized;

Fig. 2 is a schematic showing of a vibrating reed which is polarized by means of a half-wave rectifier;

Fig. 3 is a schematic showing of a vibrating reed which is polarized by means of two half-wave rectifiers;

Fig. 4 is a schematic showing of a synchroscope embodying a polarized reed similar to that shown in Fig. 3;

Fig. 5 is a schematic showing of a standard synchroscope dial together with a corresponding straight line dial, the latter being useful in the device shown in Fig. 4;

Fig. 6 is a schematic showing of a straight line dial and patterns of the traveling beam which indicate either fast or slow, that is, leading or lagging phase angle between two alternating current sources; and Fig. 7 is a schematic showing of a power factor meter embodying a polarized reed in accordance with the invention.

It is a well known fact that most synchroscopes now on the market have a considerable amount of inertia and will, therefore, not follow rapid changes in beat frequency. This condition is particularly objectionable when synchronizing generators are driven by propeller type water-wheels because the speed regulation of this type of equipment is poor, particularly at low heads of water. There have been applications, where, due to rapid variations or reversals of beat frequency, the synchroscope has temporarily lagged as much as 30 degrees from the correct position, and this condition is, of course, objectionable if manual synchronizing is used in the station.

If a synchroscope be designed on the mechanical differential principle, i. e., arranging a mechanical differential driven by two synchronous motors connected to the bus and the line respectively, a practically inertialess synchroscope can be built. It would, however, be necessary to provide means so that the synchronous motors always pulled in with the rotor in the same position relative to the stator winding, and not 180 degrees out of phase. This necessitates the use of a commutator on the motor shaft, operating in connection with relays to assure correct phase angle indications. Such a synchroscope would be too bulky and expensive and is, therefore, not practicable.

If, as shown in Fig. 1, a piece of steel 1 or other magnetic material having one of its ends anchored is placed in an alternating current magnetic field produced by magnet 2 energized by a suitable alternating current source of supply $L_1$—$L_2$, the travel T of the free end of the piece of steel has a definite relation to the alternating current supply voltage wave.

The arrangement shown in Fig. 1 has the same defect as the synchronous motor scheme with respect to the "pull in" position. In order to synchronize the reed in the correct "pull in" position and in accordance with the invention, an arrangement as shown in Fig. 2 or Fig. 3 is used. By connecting a half-wave rectifier 3 such as a "Rectox" in series with the magnet coil 2 (see Fig. 2), the reed is attracted towards the magnet only when the voltage of $L_1$ is positive in relation to $L_2$. In Fig. 3 is shown an arrangement comprising two magnets 4 and 5 energized through "Rectox" rectifiers 6 and 7, respectively, during the positive and the negative half cycle of alternating current voltage respectively.

Experiments showed that preferably the reed should be designed so that its critical frequency is slightly higher than the operating frequency, although satisfactory operation is also obtained at the tuned frequency provided the damping produced by the air is sufficient to limit the deflection of the reed so as to keep the mechanical stresses within permissible limits.

Using the polarized reed principle, a novel type of synchroscope as shown in Fig. 4 may be devised. The synchroscope consists of a reed 8 which is anchored at 9. The reed is equipped with a thin plate 10 which has a small hole 11 therein. The magnets 12 and 13 are energized from the line through "Rectox" rectifiers 14 and 15, respectively. As previously described, the reed 8 will vibrate in synchronism with the line voltage $L_1$ and $L_2$, and the hole in plate 10 will always be in a definite location dependent upon the phase angle of the line voltage $L_1$—$L_2$ with respect to the bus voltage across busses $B_1$ and $B_2$.

A glow tube 16, preferably a Strobotron tube or tube with similar characteristics, is placed behind plate 10 so that the glow from the tube can be seen through the hole 11. The anode voltage for tube 16 is supplied by "Rectox" rectifiers 17 and 18 whose output voltages are smoothed out by means of condensers 19 and 20, respectively. "Rectox" rectifier 17 is supplied with alternating current beat voltage that is, the resulatant of the voltage producing the alternating currents in the lines $L_1$ and $L_2$ and the busses $B_1$ and $B_2$ and is connected in "bright lamp" circuit, and rectifier 18 whose output voltage is opposing the voltage from rectifier 17 is connected to transformer 21 which is connected to the bus voltage $B_1$—$B_2$. An impulse transformer 22 is also connected across the bus voltage and the secondary winding of the impulse transformer is connected to the grid 23 and the cathode 24 of the tube 16.

The purpose of tube 16 is to supply a luminous discharge of high intensity and short duration during each cycle. This discharge will occur at a definite phase angle location (referring to the voltage across buses $B_1$—$B_2$) once during each cycle of bus voltage, and is initiated by the grid control action of impulse transformer 22.

When the line voltage is in phase with the bus voltage the tube discharge occurs when the reed, and consequently the hole 11 is in the center position as shown in Fig. 4, and an illuminated spot will therefore appear on a translucent glass dial 25 placed in front of plate 10. If the line voltage is out of phase with the bus voltage the illuminated spot appears either on the left side or on the right side of the center position, depending upon whether the bus voltage is leading or lagging the line voltage.

In order to explain the operation of the device reference is made to Fig. 5 which shows a standard synchroscope dial and the corresponding straight line dial as used in Fig. 4. Assuming that the phase angle is zero and then changes in the fast direction to 90—180—270 and back to zero, the light spot would move as shown in the lower part of Fig. 5, and it will be seen that the light spot appears in the center location if the phase angle is zero as well as 180. To make the synchroscope indicate only the zero position, and to also indicate whether the machine is fast or slow the tube 16 is prevented from glowing when the phase angle changes from 90 to 180 to 90. This feature is obtained by opposing the anode beat voltage obtained from the rectifier 17 by the voltage from rectifier 18 so that if the phase angle difference between line and bus exceeds 90° the total anode potential of tube 16 will be too low to cause breakdown of the tube regardless of the magnitude of the grid voltage obtained from impulse transformer 22.

This arrangement results in the dial patterns shown in Fig. 6. When the machine is fast the light spot appears only when moving from left to right. When the machine is slow the visible light spot movement is only from right to left.

The polarized reed such as shown in Fig. 2 is also applicable to a power factor meter, such as shown in Fig. 7. In many industrial applications rapid variations of power factor occur, and no instrument is available to indicate these rapid variations because of the mechanical inertia of the moving mechanism of the instrument. For this reason it is often necessary to make expensive oscillograph tests to determine the variations in power factor, where an ordinary instrument would have been entirely satisfactory provided the instrument did not have any mechanical lag.

Fig. 7 shows a power factor meter which (1) will give instantaneous indication of power factor, (2) which is simple to operate and read, (3) which can be built into a standard instrument case, and (4) which will not be more expensive than the standard power factor meters now on the market.

Referring to Fig. 7, the load 31 whose power factor is to be measured is connected across an alternating current source $L_1$—$L_2$. A vibrating reed 32 with characteristics as described above is equipped with a thin plate 33 in which is a small hole. Polarized synchronous operation of the reed is obtained by means of magnet 34 and "Rectox" rectifier 35. Glow discharge tube 36, which preferably is a cold cathode tube, for example a Strobotron, is supplied with direct current anode potential by means of "Rectox" rectifier 37 connected to voltage $L_1$—$L_2$. A condenser 38 is connected across the "Rectox" rectifier to give a discharge current of high magnitude and short duration through tube 36. The grid circuit of tube 36 is controlled by means of an impulse transformer 39 excited from the load current. This impulse transformer produces a peaked voltage which has a definite phase relation to the load current wave. For this reason, the tube illuminates the hole when the load current has a definite phase angle, and through the stroboscopic action of the vibrating reed, the phase angle can be read directly as outlined in detail above in the description of the synchroscope.

Because of the polarizing action of "Rectox" rectifier 35 the hole, when illuminated, will be located on the left hand side if the power factor is leading, and will be on the right hand side if the power factor is lagging.

This invention is not limited to any of the particular devices or structures, or details of construction, as illustrated, nor to any specific arrangement that is shown since they may be modified and rearranged without departing from the spirit and scope of the invention as set forth in the appended claims.

What is claimed is:

1. In a polarized electrical instrument for indicating the relationship of electrical characteristics of a pair of alternating current circuits, the combination of, a strip-like member of magnetic material having a fixed end and a free end which is adapted for vibration, electromagnetic means for effecting vibration of said strip-like member upon energization thereof, means for supplying alternating current to said electromagnetic means from one of said alternating current circuits whereby the strip-like member vibrates at a frequency corresponding to that of the energizing alternating current, rectifier means for polarizing the electromagnetic means with respect to the energizing alternating current, a grid controlled glow discharge lamp having an anode, a cathode and a grid, means for energizing the anode, an electrical impulse transformer having primary and secondary windings, means for supplying alternating current to said primary winding from the other of said pair of electrical circuits, circuit means connecting said secondary winding to said grid for controlling said lamp for periodic illumination, and an apertured member secured to the vibrating end of said strip-like member and located adjacent said lamp.

2. In a polarized electrical instrument for indicating the relationship of electrical characteristics of a pair of alternating current circuits, the combination of, a reed of magnetizable material, electromagnetic means adjacent said reed, means for supplying alternating current from one of said alternating current circuits to said electromagnetic means for effecting vibration of said reed at a frequency corresponding to that of said one alternating current circuit, rectifier means for polarizing said electromagnetic means with respect to the alternating current of said one circuit, a grid controlled glow discharge lamp having an anode, a cathode, and a grid, means for supplying electrical energy to said anode, electrical impulse producing means connected with said grid and cathode, means for energizing said electrical impulse producing means with alternating current from the other of said pair of alternating current electrical circuits, for periodically effecting illumination of the lamp, and an apertured member rigidly secured to the reed to vibrate therewith, said apertured member being disposed adjacent said lamp.

3. Polarized synchronizing apparatus comprising, in combination, a reed, an alternating current source, a pair of electromagnets disposed on opposite sides of said reed and connected in parallel with said source, a pair of oppositely directed half-wave rectifiers, each of which is connected in one of said parallel circuits in series with each of said electromagnets thereby causing said reed to vibrate with the same frequency as said alternating current source, a second alternating current source the frequency of which is adapted to be varied, a lamp and impulse means which are energized by said second source so as to make said lamp luminous only during a small fractional portion of each cycle, an apertured member secured to said reed and located adjacent said lamp, the position of said apertured member relative to said lamp at the time of illumination of said lamp being a visual indication of the direction and extent of the phase angle between the voltages of said first source and said second source.

4. A synchroscope comprising, in combination, a reed, an alternating current source, a pair of electromagnets disposed on opposite sides of said reed and connected in parallel with said source, a pair of oppositely directed half-wave rectifiers, each of which is connected in one of said parallel circuits in series with each of said electromagnets thereby causing said reed to vibrate with the same frequency as said alternating current source, a second alternating current source, the frequency of which is adapted to be varied, an impulse transformer having a primary and a secondary, the primary being connected across said second alternating current source, a grid controlled glow lamp which is controlled by the voltage across the second of said impulse transformer and which is effective to be luminous only during a small fractional portion of each cycle, an apertured member secured to said reed and located adjacent said lamp, the position of said apertured member relative to said lamp at the time of illumination of said lamp being a visual indication of the direction and extent of the phase angle between the voltages of said first source and said second source.

5. A synchroscope comprising, in combination, a reed, an alternating current source, a pair of electromagnets disposed on opposite sides of said reed and connected in parallel with said source, a pair of oppositely directed half-wave rectifiers, each of which is connected in one of said parallel circuits in series with each of said electromagnets thereby causing said reed to vibrate with the same frequency as said alternating current source, a second alternating current source, the frequency of which is adapted to be varied, an impulse transformer having a primary and a secondary, the primary being connected across said second alternating current source, a grid controlled glow lamp which is controlled by the voltage across the second of said impulse transformer and which is effective to be luminous only during a small fractional portion of each cycle, an apertured member secured to said reed and located adjacent said lamp, the position of said apertured member relative to said lamp at the time of illumination of said lamp being a visual indication of the direction and extent of the phase angle between the voltages of said first source and said second source, means for suppressing illumination of the lamp while said phase angle changes from 90 to 180 to 90 degrees thereby securing a movement of the luminous spot as viewed through the aperture in either one direction or an opposite direction which denotes that the phase angle is either too fast or too slow.

GUNVALD GULLIKSEN,
*Administrator of the Estate of Finn H. Gulliksen, Deceased.*

REFERENCES CITED

The following references are of record in the file of this patent:

UNITED STATES PATENTS

| Number | Name | Date |
|---|---|---|
| Re. 19,816 | Wurzbach et al. | Jan. 7, 1936 |
| Re. 19,817 | Wurzbach et al. | Jan. 7, 1936 |
| 759,513 | Frahm | May 10, 1904 |
| 1,649,585 | Grondahl | Nov. 15, 1927 |
| 1,652,495 | Pierce | Dec. 13, 1927 |
| 1,655,482 | Weyandt | Jan. 10, 1928 |
| 1,661,651 | Bossart | Mar. 6, 1928 |
| 1,775,752 | Edwards | Sept. 6, 1930 |
| 1,882,399 | Pierce | Oct. 11, 1932 |
| 1,889,128 | McClintock | Nov. 29, 1932 |
| 1,932,520 | Horsch | Oct. 31, 1933 |
| 2,068,575 | Stark | Jan. 19, 1937 |
| 2,188,785 | Hall | Jan. 30, 1940 |
| 2,172,271 | Athy et al. | Sept. 5, 1939 |
| 2,279,053 | Modlinger | Apr. 7, 1942 |

FOREIGN PATENTS

| Number | Country | Date |
|---|---|---|
| 118,028 | Switzerland | Dec. 16, 1926 |
| 323,794 | Germany | Aug. 7, 1920 |
| 368,255 | Italy | Feb. 11, 1939 |
| 388,902 | France | June 13, 1908 |
| 485,320 | Germany | Oct. 30, 1929 |